United States Patent Office 3,349,909
Patented Oct. 31, 1967

3,349,909
PROCESS OF SEPARATING PARTICLES OF
DIFFERENT WATER WETTABILITY
Heinz P. Studer, Bellaire, Tex., assignor to Shell Oil Company, New York, N.Y., a corporation of Delaware
No Drawing. Filed Nov. 2, 1964, Ser. No. 408,349
11 Claims. (Cl. 209—207)

ABSTRACT OF THE DISCLOSURE

More water-wettable materials are separated from less water-wettable materials by (1) comminuting a mixture of these materials into particles from about 1–20 microns, (2) introducing these particles into a two-phase three-liquid system containing an aqueous liquid, a water immiscible liquid and a third liquid miscible with both the aqueous and water immiscible liquids, and (3) agitating the mixture in the liquid to bring it into contact with both phases thereby separating the less wettable material into the water immiscible phase and the more wettable materials into the aqueous phase.

---

This invention relates to an improved process for separating mixtures of fine particles for purposes such as the purification of natural occurring zeolite-containing minerals. More particularly, the process involves the purification of a natural zeolite by a separation of the zeolite components from non-zeolitic components occurring therewith.

It is well known that certain synthetic zeolitic materials have rigid three-dimensional anionic networks with intra-crystalline intrastitial channels whose narrowest cross-section has essentially a uniform diameter, e.g., in the range of 3–13 angstrom units, and the characteristic of selectively sorbing compounds whose maximum critical molecular diameter is not substantially larger than said channel diameter. These zeolites are known as "molecular sieves" and the intracrystalline channels are known as "pores." Such zeolites are described, for example, in a paper entitled, "Zeolites as Absorbents and Molecular Sieves" by R. M. Barrer, "Annular Reports on the Progress of Chemistry for 1944," vol. 1, pp. 41–46, London (1945), and in U.S. Patent 2,306,610 to Barrer.

Certain of these synthetic zeolitic molecular sieves are commercially available and are characterized by very great selectivity and a very high capacity for sorbing compounds whose maximum critical molecular diameter is of the order of the pore diameter of the molecular sieve. The molecular sieves are, therefore, useful for separating compounds of a given maximum critical molecular diameter out of mixtures containing other compounds of large maximum critical diameter.

Among the more useful hydrocarbon separations affected by the sieres are the sorption of straight-chain hydrocarbons, such as the normal paraffins and normal olefins, from branched-chain hydrocarbons, such as the normal paraffins and normal olefins, from branched-chain hydrocarbons, such as isoparaffins and isoolefins. The branched-chain hydrocarbons, of course, are too large in cross-section and are therefore not sorbed by the sieves.

The discovery of natural zeolite deposits of appreciable size has caused considerable effort to be directed at the enhancement of the commercially applicable aspects of these naturally occurring zeolite-containing minerals. Extensive experimental studies of the absorption characteristics and ion exchange ability of these naturally occurring zeolite-containing minerals reveal that they are considerably inferior to the synthetic zeolites. Electron micrographs indicated that this inferiority could be caused by substantial quantities of unaltered and inert glass-like materials, so much of this siliceous material being present that no more than 20–50% of the naturally occurring mineral is actually zeolite crystals.

It is, therefore, the principal object of this invention to separate finely divided materials of greater and lesser porosity. It is a more specific object to beneficiate naturally occurring zeolite-containing minerals. It is a further object of this invention to improve the absorption characteristics and ion-exchange ability of naturally occurring zeolite-containing minerals. It is another object of this invention to separate glass-like particles from the zeolitic particles in naturally occurring zeolite-containing minerals. It is still another object of this invention to beneficiate naturally occurring zeolite-containing minerals by a flotation process. These objects will be better understood and others will become apparent from the description of the invention as given hereinafter.

Now, in accordance with a preferred embodiment of this invention, naturally occurring zeolite-containing minerals are beneficiated, i.e., the absorption characteristics and ion exchange abilities are substantially improved, by separating particles of inert glass-like materials therefrom. This is accomplished by crushing or otherwise comminuting a mixture of particles so that the resulting particles have a size of about 1 to 20 microns and preferably less than about 10 microns, e.g., a mixture of, respectively, more and less, water-wettable materials, such as a naturally occurring zeolite-containing mineral to obtain a mixture of separate particles, such as particles of the siliceous-type materials and zeolite, and thereafter separating these distinct particles by introducing the finely divided material into a three-liquid two-phase system containing two immiscible liquids and a third liquid that is miscible with each of the two immiscible liquids, in this manner, the more wettable particles, such as the zeolite particles which are more wettable than the siliceous impurities, are retained in one layer and the siliceous materials are retained in the other layer.

Although it is possible to use a two-liquid phase separation technique to separate materials of substantially similar chemical composition, but varying hydrophilic qualities, certain disadvantages are inherent. The less water-wettable particles tend to be held at the interface between the liquid phases, or layers, and the separation cannot readily be accomplished in one step. The removal of a significant amount of these less wettable particles requires repeated contacts with fresh portions of such an interface. Through the use of the third liquid component, having appropriate physical properties, the interfacial tension between the two immiscible liquids can be reduced, and this allows a more extensive separation, than that usually obtained with conventional two-liquid phase flotation separation processes. By the term "wettable," as used throughout this application, is meant a substance which is a hydrophilic, i.e., which absorbs or adsorbs water.

The third liquid which is added to a liquid system of two immiscible liquids, is preferably substantially completely miscible with both liquids of the immiscible pair, the three-liquid system formed thereby containing one immiscible pair and two miscible pairs of liquids.

Such a third liquid, miscible with both of the two immiscible liquids, will distribute between the two layers and, when added in a sufficient amount, will bring about a complete mixture of all three liquids. Near this "isothermal critical point" or the "plait point" of the system, i.e., the point at which complete mixing occurs, but with a little less of the mutually miscible liquid than is required for a complete mixture of the three liquids, a two-layer system results in which the properties of the two layers approach each other and in which the interfacial tension between the two immiscible layers is greatly reduced. It is this two layer three component liquid that is essential to the attainment of the separations of this invention. Enough of the third liquid must be added to reduce interfacial tension between the phases. If enough of the third liquid were to be added to bring about a complete mixture of all three liquids, separation of the particles into two phases would be impossible. However, by using just a little less of the mutually miscible liquid than is required for a complete mixture a two-phase system is maintained into which the particles having different water-wettable properties can separate. The general properties of a three-liquid system such as utilized in the instant invention is found in "Fundamental Principles of Physical Chemistry" by C. F. Prutten and S. H. Maron, 1955, pp. 417–418.

Three-liquid systems which have been found to be most advantageous for the beneficiation of zeolites empoly an aqueous liquid such as water and an oil-miscible, water-immiscible liquid, such as a chlorinated hydrocarbon, as the immiscible pair, and a glycol ether (or alcohol, or a similar compound) as the mutually miscible third liquid. In such a system, it has been observed that the less wettable fraction, such as a glass fraction, of finely comminuted particles, such as particles of naturally occurring zeolite-containing minerals, move through the interface of a properly adjusted system while the zeolite particles of the sample can be held in suspension in the aqueous layer by slight agitation.

Further examples of suitable liquids from which the three-liquid components can be selected include oil-miscible, water-immiscible liquids such as individual or mixed hydrocarbons, e.g., ethylene dichloride, the chlorobenzenes, chloroforms, etc.; hydrocarbons such as xylene, toluene, cyclohexane, etc.; and oil and water miscible liquids, such as individual or mixed alcohols or substituted alcohols such as isopropyl, methyl, butyl alcohols, and the like, the Cellosolves, etc., and like compounds which are relatively chemically inert and have the specified solubilities with each other and with aqueous liquids. The aqueous liquids can, of course, comprise water and water solutions into which a significant proportion of the mutually miscible liquid is capable of being portioned in the three-liquid, two-phase system.

In the naturally occurring zeolites, the undesirable non-zeolitic components, amorphous to X-ray diffraction, are thought to consist of unaltered volcanic glass with occasional trace amounts of quartz and feldspar.

The particles of zeolite and non-zeolite material can be contacted by the three-liquid system of this invention in any convenient manner which will result in a selective separation. A preferred method is to stir the finely comminuted naturally occurring zeolite-containing sediment into the liquid mixture and subsequently allow it to separate into two layers. The glassy fraction of the zeolitic ground material being less wettable, sediments through the interface into the bottom layer, whereas the zeolite by means of slight agitation is held in suspension in the upper layer.

A convenient technique for keeping the zeolite in suspension involves rotating the cylindrical container around its axis at an angle of, for example, approximately 60° from the horizontal. The speed of the rotation is most preferably adjusted to about 1 rotation in 5 seconds or 12 revolutions per minute. The amount of liquid and the angle of the container axis should be chosen in a way that the upper level of the sediment and the lower level of the interface do not overlap in respect to a section at right angle through the axis of the container.

This separation technique is applicable to substantially any mixture of fine (from about 1 to 20 microns, e.g., less than about 10 microns) particles that include more wettable and less wettable organic or inorganic components. Such mixtures may comprise mixtures of clay and carbonates, mixtures of clay and organic components such as pollen (in which case the three liquids are preferably selected so that the aqueous phase is the denser of the two liquid phases) and the like.

As is evident from the above paragraph and from the examples which follow, when the less wettable material, such as pollen, has a density higher than that of the more wettable material, the less wettable material separates into a lighter upper phase and the aqueous phase becomes the bottom phase. It therefore follows that the relative densities of materials to be separated determine the density of the water immiscible liquid to be used. If the more water wettable material is lighter than the less wettable material, as in the case of naturally occurring zeolites, the aqueous phase will be the upper phase and the lower phase will be a water immiscible liquid having a density greater than the aqueous phase.

In purifying natural zeolites, this separation technique can be performed in a number of ways including:

(1) Stirring or shaking the whole content with subsequent separation into two layers while rotating; and (2) By beginning the rotation at a lower angle, i.e., 45°, in such a way that the interface is allowed to touch the bottom of the container. In this manner, the sediment is brought in contact with the interface and the more water-wettable zeolite is carried from the sediment into the upper aqueous layer. Porcelain balls may advantageously be added in order to agitate the sediment. After the sediment has been worked over, the container is brought to a steeper angle, and the glassy fraction is allowed to detach from the interface. The top layer is then removed and the zeolite is isolated by sedimentation or centrifugation.

The specific examples of the invention are presented to more clearly illustrate the application of the invention, but the details thereof are not to be construed as limiting the invention.

EXAMPLE I

A mixture of clay and carbonate mineral solids, containing about 1–5 percent by weight of carbonate and comminuted to particle sizes of less than about 10 microns, was suspended in a mixture of water, 2-ethoxyethanol, and 1,2-dichloroethane. The resulting suspension was mildly agitated until it separated into an upper, predominantly aqueous, layer rich in the more wettable clay particles, and a lower, predominantly halogenated hydrocarbon, layer rich in the less wettable carbonate particles. The respective layers were flowed into separate containers and the solids contained in each were removed by centrifugation. The separation procedure converted the original mixture into two separate mixtures; one significantly richer in carbonate (essentially free of clay) and one significantly richer in clay (essentially free of carbonate).

EXAMPLE II

A mixture of clay and pollen solids (as a test sample not representative of natural occurrences), containing about 50 percent by weight of pollen and comminuted to particle sizes of less than about 10 microns, was suspended in a mixture of water, isopropyl alcohol, and toluene. The resulting suspension was mildly agitated until it separated into an upper, predominantly toluene, layer rich in the less wettable pollen particles and a lower, predominantly aqueous, layer rich in the more wettable clay particles. The respective layers were flowed into separate containers and the solids contained in each were removed by centrifugation. The separation procedure converted the original mixture into two separate mixtures; one substantially free of pollen and one substantially free of clay.

EXAMPLE III

A ten gram sample of a naturally occuring-erionite-containing ore was ground and sieved to separate the particles larger than 10 microns. Seven percent of the material was rejected. The remaining mixture of non-erionite particles and erionite particles of 10 micron size or less was suspended in a mixture of water, 2-ethoxyethanol and 1,2-dichloroethane. The resulting suspension was mildly agitated until it separated into an upper, predominately aqueous layer, rich in the more wettable erionite particles, and a lower, predominately halogenated hydrocarbon layer, rich in the less wettable non-erionite particles. The respective layers were flowed into separate containers and the solids suspended in each were removed by centrifugation. The separation procedure converted the original mixture into two mixtures; the upper layer containing 3.1 grams of erionite, 31% of the original sample (essentially free of non-erionite) and the lower layer containing 6.24 grams of non-erionite material, 62% of the original sample (essentially free of erionite).

Tests of the selectivity and capacity of this beneficiated erionite material when compared with results of similar tests with the native ore revealed a substantial improvement in these properties of the mineral prepared by the process described herein; see Table I.

TABLE I.—WEIGHT LOSS ON OUTGASSING AND m-PENTANE SORPTION OF ERIONITES

| Material | Per Unit Weight Outgassed Sample | | | | | |
|---|---|---|---|---|---|---|
| | Weight Loss on Outgassing in Vacuo at 300° C. | n-Pentane Uptake at 100 mm. Hg and 50° C. | | | | |
| | | After 30 sec. | After 2 min. | After 15 min. | At End | Min. to End |
| Naturally occurring | 0.084 | 0.005 | 0.006 | 0.015 | 0.030 | 200 |
| Treated | 0.170 | 0.018 | 0.038 | 0.064 | 0.086 | 950 |

I claim as my invention:

1. A process for separating a mixture of more water wettable material from less water wettable materials comprising:
   (1) comminuting said mixture into particles from about 1 to about 20 microns;
   (2) introducing said mixture of particles into a two-phase three-liquid system containing an aqueous liquid, a water-immiscible liquid and a third liquid miscible with both the aqueous and water-immiscible liquids, said third liquid being present in an amount less than that which will cause a complete mixture of the three liquids thereby forming an aqueous phase and a non-aqueous phase;
   (3) agitating said mixture in said liquid system to bring the mixture into contact with both phases thereby causing the less water-wettable materials to separate into the non-aqueous phase and the more water-wettable materials to separate into the aqueous phase; and
   (4) recovering the separated particles from each of said phases.

2. A process in accordance with claim 1 wherein the mixture is a naturally occurring zeolite-containing ore in which the more water wettable materials are the zeolite particles.

3. A process in accordance with claim 1 wherein the particles are introduced into the upper phase of the two-phase three-liquid system.

4. A process in accordance with claim 1 wherein the particles are introduced near the interface of the two-phase three-liquid system.

5. A process in accordance with claim 1 wherein the particles are introduced into the bottom phase of the two-phase three-liquid system.

6. A process in accordance with claim 1 wherein the aqueous liquid is water.

7. A process in accordance with claim 1 wherein the water-immiscible liquid is a chlorinated hydrocarbon.

8. A process in accordance with claim 7 wherein the chlorinated hydrocarbon is 1,2-dichloroethane.

9. A process in accordance with claim 1 wherein the third liquid is a glycol ether.

10. A process in accordance with claim 9 wherein the glycol ether is 2-ethoxyethanol.

11. A process for separating zeolite from naturally occurring zeolite containing ore comprising:
    (1) comminuting said ore into zeolitic and non-zeolitic particles of from about 1 to about 20 microns;
    (2) introducing said particles into a two-phase three-liquid system containing water, 1,2-dichloroethane and 2-ethoxyethanol, said 2-ethoxyethanol distributing between the water and 1,2-dichloroethane and being present in an amount less than that which will cause a complete mixture thereby forming an upper water phase and a lower 1,2-dichloroethane phase;
    (3) agitating said particles in said liquid system to bring the particles to contact with both phases thereby causing the zeolitic particles to separate into the upper water phase and the non-zeolitic particles to separate into the lower 1,2-dichloroethane phase; and
    (4) recovering the separated particles from each of said phases.

References Cited

UNITED STATES PATENTS

| | | | |
|---|---|---|---|
| 2,686,592 | 8/1954 | Miller | 209—172 X |
| 2,688,401 | 9/1954 | Schmitkons | 209—172 |
| 3,037,843 | 6/1963 | Mason | 23—112 |
| 3,259,237 | 7/1966 | Schoeld | 209—9 |

FRANK W. LUTTER, *Primary Examiner.*